United States Patent [19]
Frey et al.

[11] 3,860,326

[45] Jan. 14, 1975

[54] SLIDE PROJECTOR DRIVE MECHANISM

[75] Inventors: Gerald J. Frey, 3887 State St., Suite 202, Santa Barbara, 93105; Gary E. Peterson, Sun Valley, Calif.

[73] Assignee: said Frey, by said Peterson

[22] Filed: Aug. 17, 1972

[21] Appl. No.: 281,418

Related U.S. Application Data

[62] Division of Ser. No. 200,468, Nov. 19, 1971, Pat. No. 3,729,254.

[52] U.S. Cl. .............................................. 353/109
[51] Int. Cl. .......................................... G03b 23/08
[58] Field of Search ........... 353/109, 108, 110, 103, 353/106, 116, 88, 92

[56] References Cited
UNITED STATES PATENTS

| | | | |
|---|---|---|---|
| 2,874,497 | 2/1969 | Huff | 353/116 |
| 3,003,394 | 10/1961 | Figaretti | 353/109 |
| 3,263,559 | 8/1966 | Golden | 353/116 |
| 3,319,370 | 5/1967 | Robinson | 353/106 |
| 3,632,200 | 1/1972 | Frey | 353/109 |

*Primary Examiner*—Samuel B. Rothberg
*Assistant Examiner*—A. J. Mirabito
*Attorney, Agent, or Firm*—Fulwider, Patton, Rieber, Lee & Utecht

[57] ABSTRACT

A slide projector for slides mounted on a slide holder having a series of clips around an endless flexible belt which is inserted in the projector through an access opening in the top wall, fitted loosely around parallel rotary supporting elements permanently mounted in the recess to project toward the access opening, located at the proper level in the projector by positioning surfaces in the projector, and then tensioned by moving one of the supporting elements away from the other. The movable supporting element is positioned in one of a plurality of different zones, for slide holders of different capacities, and is spring-loaded in each zone to apply the proper tensioning force. Feeding of the slides is accomplished by a reciprocating motor and a driver having a reversible ratchet coupling with one of the rotary elements which has teeth for engaging the overhanging end portions of alternate clips around the belt, and the driver also serves as the actuator for a positioning fork which locks the slide to be projected against one of the rotary elements. In a modified form, the driver also operates a hold-out apparatus engageable with the slides on opposite side of the one being projected, and an oscillating shutter for blocking the light beam during slide changing.

14 Claims, 15 Drawing Figures

PATENTED JAN 14 1975 3,860,326

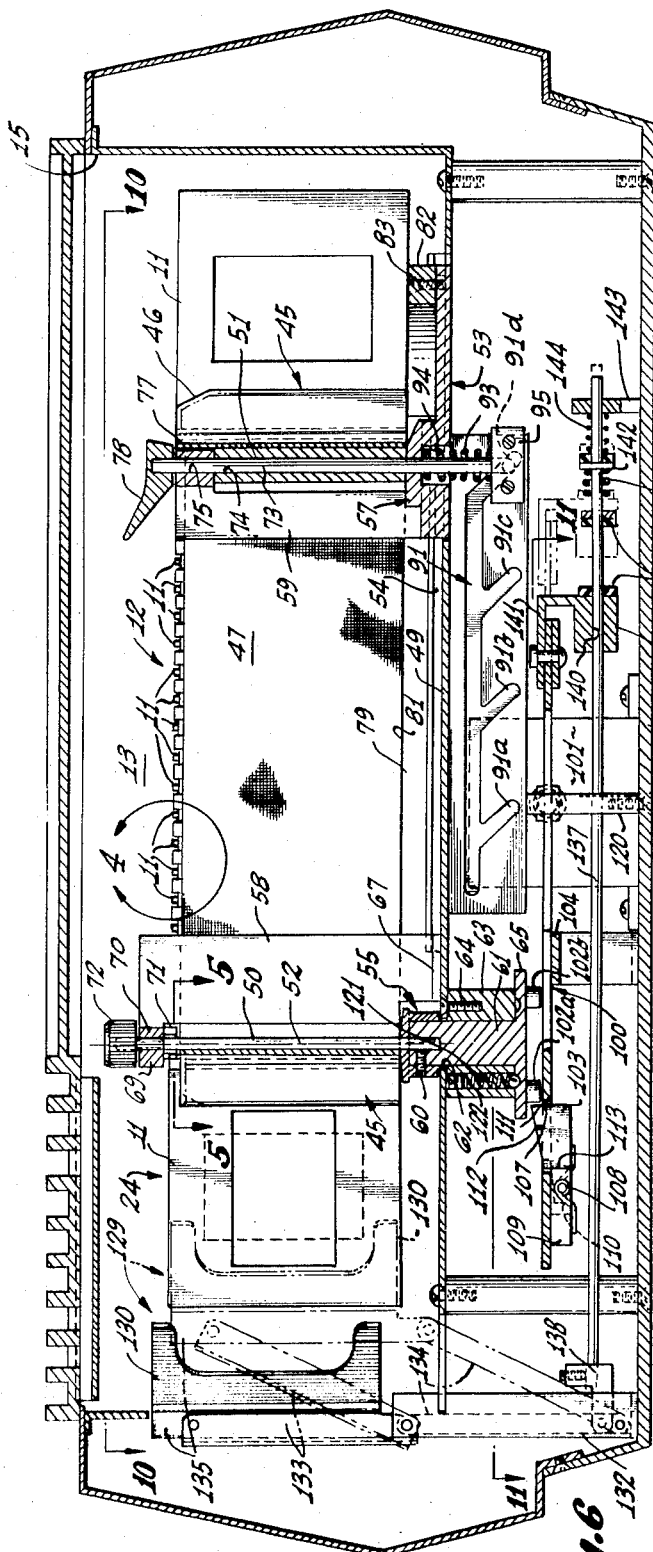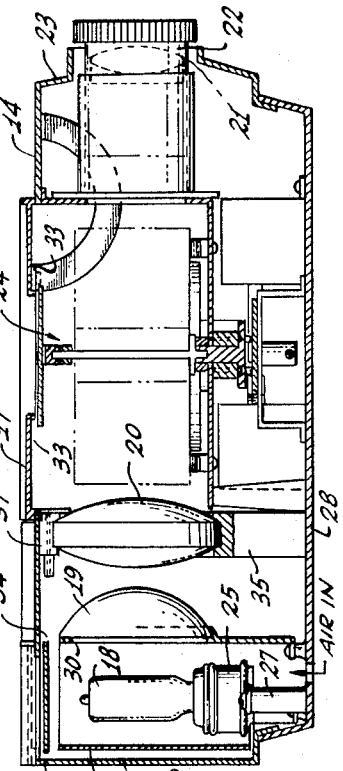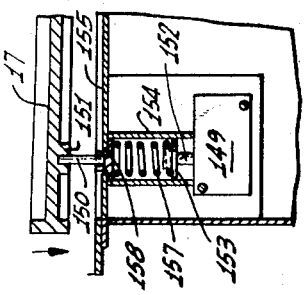

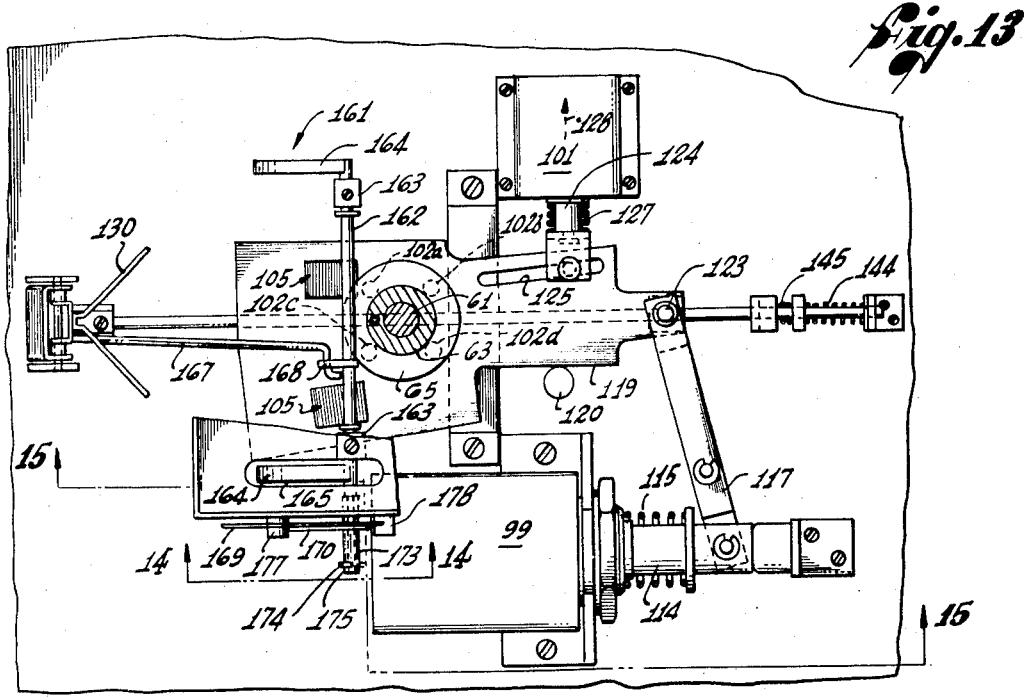
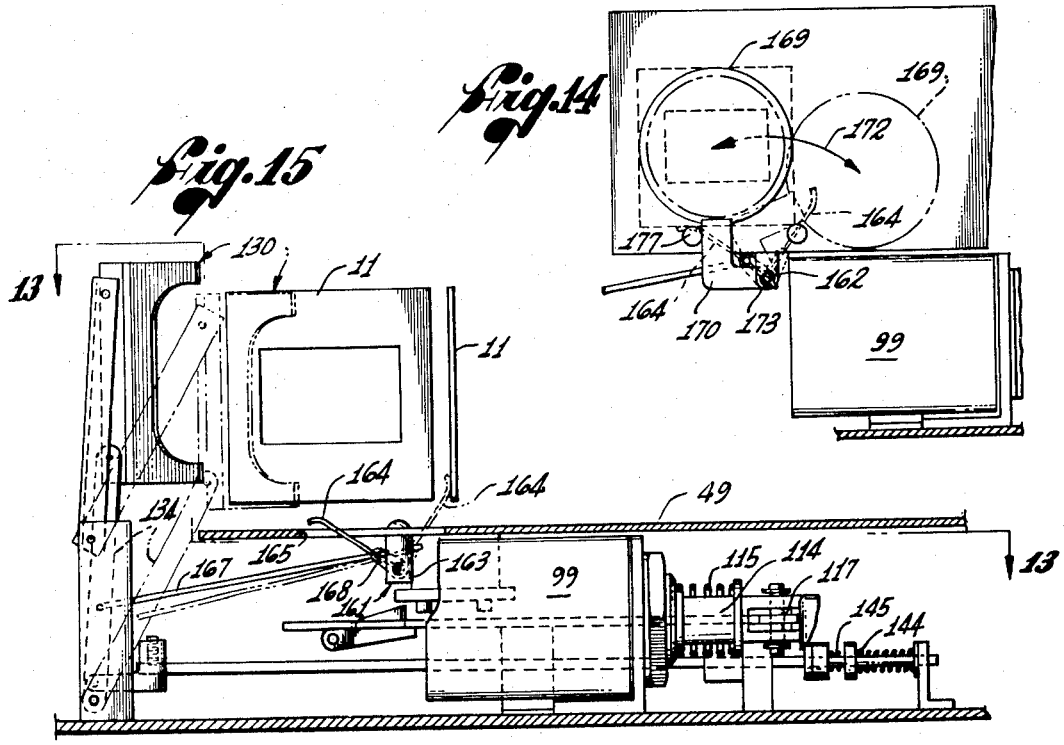

SLIDE PROJECTOR DRIVE MECHANISM

CROSS-REFERENCE TO RELATED APPLICATION

This is a division of copending application Ser. No. 200,468, filed Nov. 19, 1971, and now U.S. Pat. No. 3,729,254, issued Apr. 24, 1973 and entitled SLIDE PROJECTOR FOR UNSUPPORTED FLEXIBLE SLIDE HOLDERS.

BACKGROUND OF THE INVENTION

This invention relates to slide projectors for optically projecting enlarged images from transparencies onto a screen or the like. The invention relates more specifically to a new and improved slide projector for use with an endless flexible slide holder having means thereon for gripping a series of slides and holding them in outwardly projecting, side-by-side relation for insertion in the projector and for step-by-step feeding through a film gate, herein called a projection position or station, in the projector.

An earlier slide projector of this general type is disclosed in U.S. Pat. No. 3,170,369, in which the slide holder is a box-like magazine having two parallel shafts therein supporting an endless flexible belt with a series of clips fastened to its outer side to receive and grip the edges of the slides to be projected. The magazine was designed to be fitted into a recess in the top of the projector, and was both positioned relative to the optical system of the projector and coupled to the drive mechanism of the projector as an incident to its insertion. The drive mechanism included a rotary motor coupled by a clutch and a stepping device to one of the supporting shafts, to rotate the shaft step by step in a selected direction to drive the belt around the shafts and bring successive slides into a projection position extending downwardly from the lower shaft of the magazine and across the axis of the optical system. To change from one group of slides to another, one magazine was removed and another was fitted into the projector in its place.

In general, such prior projectors were suitable for their intended purposes, and had several advantages over other types of projectors that have been available. The rotary drive mechanisms used by such projectors were relatively bulky, slow and expensive, and sometimes noisy.

SUMMARY OF THE INVENTION

The present invention resides in a new and improved slide projector having a simplified and very effective drive mechanism which uses a single reciprocating actuator and a ratchet drive device both to feed the slide holder step by step in a smooth and rapid, reversible manner, and also to operate additional components of the projector, including a slide-positioning fork, in precisely timed relation with the movements of the slide holder. A second reciprocating actuator shifts the drive mechanism selectively between forward and reverse modes of operation, the ratchet drive device having forward and reverse modes determined by the position of a selectively shiftable element of the drive mechanism.

The supporting shaft positioned alongside the slide-projection station preferably is square in cross-section so that the slide to be projected is positioned against a flat side of the shaft and the two adjacent slides are held 90° away from the slide being projected, as a result of engagement of the carrier with the adjacent flat sides of the shaft. To insure against sagging of these adjacent slides into the light path and to enhance the tensioning of the carrier about the square shaft, a novel hold-out apparatus is incorporated in and operated by the drive mechanism to engage both adjacent slides and press them positively away from the slide being projected. This same apparatus is advantageously used to operate a shutter for covering and uncovering the light path during slide changing, so as to avoid a possibly objectionable light flash or streak.

Other objects and advantages of the invention will become apparent from the following detailed description, taken in conjunction with the accompanying drawings.

BRIEF DESCRIPTION OF THE DRAWINGS

FIG. 6 is an enlarged transverse cross-sectional view taken along line 6—6 of FIG. 1, through the slide-projection station and substantially perpendicular to the optical axis of the projector;

FIG. 7 is a longitudinal cross-sectional view taken along line 7—7 of FIG. 1, substantially along the optical axis, on a smaller scale than the scale of FIG. 6;

FIG. 8 is an enlarged fragmentary cross-sectional view taken substantially along line 8—8 of FIG. 1 after the cover door has been placed in a nearly closed position.

FIG. 9 is an enlarged fragmentary cross-sectional view taken substantially along line 9—9 of FIG. 1 after the cover door has been placed in a fully closed position;

FIG. 13 is a fragmentary plan view of parts of the drive mechanism and slide positioning apparatus of a modified form of the projector, the view being taken substantially along line 13—13 of FIG. 15;

FIG. 14 is a fragmentary view, partly in section, taken along line 14—14 of FIG. 13; and FIG. 15 is a fragmentary view, partly in section, taken substantially along line 15—15 of FIG. 13.

DETAILED DESCRIPTION

Figure 1:
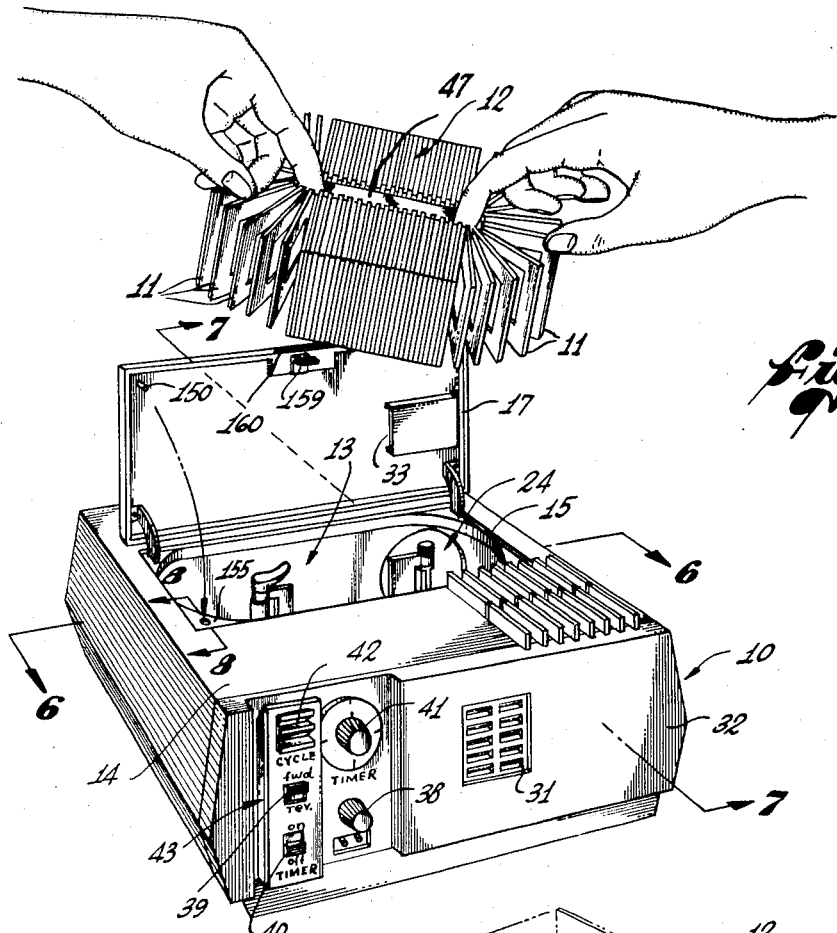
FIG. 1 is a perspective view of a slide projector that is equipped with a drive mechanism embodying the novel features of the present invention, shown with the cover open and a slide holder loaded with slides positioned for insertion into the projector.

As shown in the drawings for purposes of illustration, the invention is embodied in the drive mechanism of a slide projector 10 for use in projecting images from conventional framed transparencies or slides 11, supported on a slide holder 12, onto a conventional viewing screen or the like (not shown). In general, the projector comprises a hollow case, shown most clearly in FIG. 1, having a slide-receiving recess 13 extending downwardly from its upper side 14 from an access opening 15 that is closed during normal operation by a hinged cover door 17. The projector has a basically conventional optical system comprising a lamp 18 (FIG. 7) mounted in one rear corner of the case, condensing lenses 19 and 20 in front of the lamp, and an objective lens 21 in a lens barrel 22 that is movably mounted in the front wall 23 of the case to project an image from a slide 11 positioned in a film gate 24 between the condensing and objective lenses, herein referred to as the projection station.

As shown in FIG. 7, the lamp 18 has a conventional bulb which is fitted into a socket 25 supported on posts 27 upstanding from the bottom wall 28 of the case, and is surrounded by a baffle 29 having an open upper end, an opening 30 in its front side over which the lens 19 is mounted, and air-flow slots in the bottom wall 28 for forced circulation of cooling air around the lamp. For this purpose, a blower (not shown) is provided in the case, in front of an exhaust vent 31 (FIG. 1) in the rear wall 32, and is arranged to exhaust air from the case while drawing outside air into the case through vents 33 in the top wall above the projection station 24, thereby cooling slides during projection, as well as through the slots in the bottom wall and vents 34 above the lamp. The lens 20 is supported in front of the baffle on a standard 35, and is secured to the top wall by a fitting 37 thereon.

With a series of slides 11 in the projector 10 on a slide holder 12, successive slides are moved one by one into the projection station 24 so that the beam of light from the lamp 18 is directed by the lenses 19 and 20 through each slide and the objective lens 21, and the image from the slide thus is projected forwardly from the front wall of the case for viewing in a conventional manner. the usual controls are provided, herein on the left portion of the rear wall 32 of the case, for manual and preferably automatic operation of the projector. For example, these controls typically include an "on-off" switch knob 38, a reversing switch button 39, an "on-off" switch button 40 for an automatic control (not shown) providing timed automatic operation, a knob 41 for setting the timed viewing interval for each slide during automatic operation, and a manually operable cycle switch button 42 for manually initiating a slide change.

Preferably, a remote-control console 43 is detachably mounted in a recess in the rear wall 32 and carries the cycle button 42, the reversing button 39, and the timer button 40, and an extension cord (not shown) is provided to connect this console to a plug-in socket 44 when remote-controlled operation is desired. Although these controls are desirable, and usually are included in a projector, it is to be understood that they are shown herein only for purposes of illustration, and do not constitute the present invention.

Figure 2:
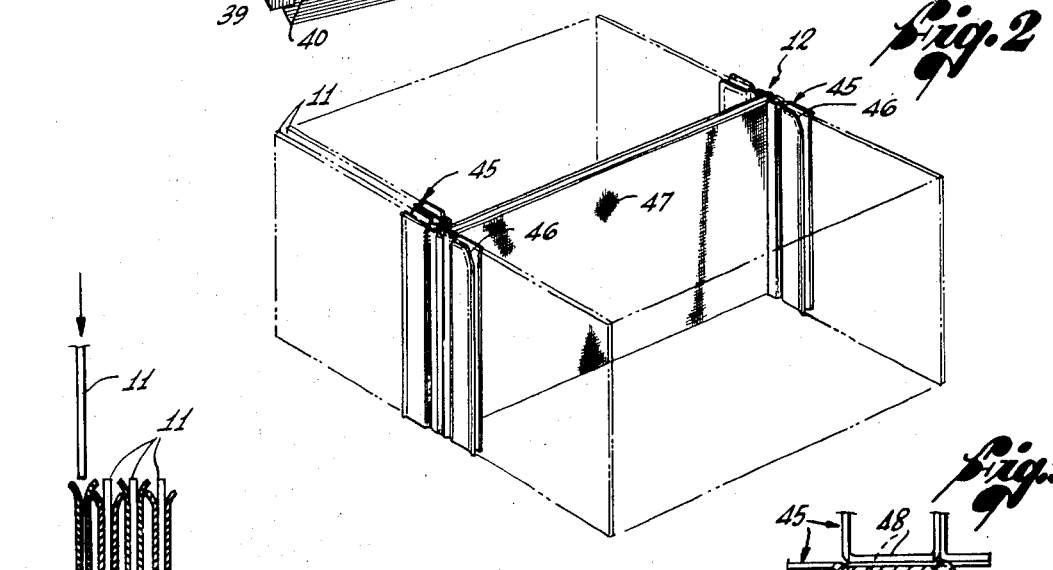
FIG. 2 is an enlarged perspective view of the slide holder of FIG. 1, shown in the storage condition with the positions of the slides thereon indicated in broken lines.

The slide holder 12 for which the projector 10 is designed comprises a series of slide-gripping elements 45 disposed in closely spaced side-by-side relation and flexibly joined together in an endless series, to receive one edge portion of a slide 11 in each gripping element and then hold the slides in outwardly projecting relation, as shown most clearly in FIGS. 1 and 2. While the holder may take various forms, the preferred form shown herein comprises an endless belt 47 of fabric or the like, forming the flexible connection, and a plurality of spring metal clips forming the gripping elements 45.

Figures 3, 4, 5:
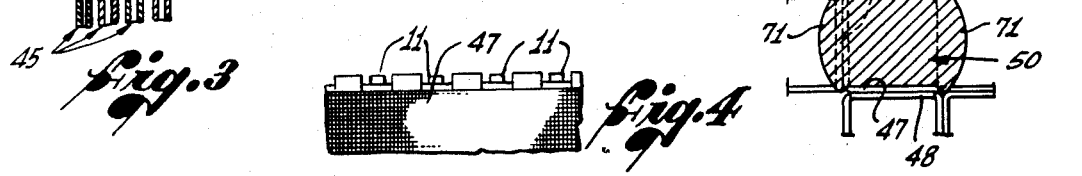
FIG. 3 is an enlarged fragmentary cross-sectional view taken in a vertical plane through the slide holder of FIG. 2 and illustrating one way of inserting slides in the clips of the holder.
FIG. 4 is an enlarged fragmentary plan view of part of the slide holder, the view being taken within the arc 4 of FIG. 6.
FIG. 5 is an enlarged fragmentary cross-sectional view showing the positions of slide clips around the fixed positioning shaft of the projector, this view being taken along line 5—5 of FIG. 6.

Each clip 45 has a flat base 48 (FIG. 5) that is secured to the outer side of the belt 47, and two spring arms (see FIGS. 2 and 3) which project away from the belt and are arranged to receive a slide between them, and to hold the slide frictionally in place. The free outer edges of the arms preferably are inclined away from each other to facilitate insertion of a slide, and the ends of the arms may be similarly inclined away from each other to permit insertion of slides through the ends, as shown in FIG. 3. In addition, one of the spring arms preferably has a flared bevel 48 (see FIGS. 2 and 6) at one end for receiving a corner of a slide, which then can be slid edgewise into the fully inserted position. It can be seen in FIGS. 1 and 2 that the clips extend transversely across the full width of the belt, and are closely packed together for a very compact arrangement of slides.

The illustrative projector 10 has supporting means in the recess 13 for freely receiving an endless flexible slide holder 12, loaded with a series of slides 11, edgewise through the access opening 15 when the cover door 17 is open, positioning the holder and the slides thereon for projection as an incident to placement of the holder loosely over the supporting means, and then being manually expanded to apply the proper tension to the slide holder, all in a quick and simple operation making it possible to handle unsupported slide holders as slide cartriges without the bulky and relatively expensive magazines that were required in the projector disclosed in the aforesaid patent. These unsupported slide holders can be very compactly stored with a full supply of slides in the "block" condition shown in FIG. 2. Moreover, the supporting means is adaptable quickly and easily to accept slide holders of substantially different predetermined sizes and slide capacities, and to apply preselected spring tension to the holders of each size, with a simple and conveniently operated expanding mechanism.

As shown most clearly in FIG. 6, the slide-receiving recess 13 of the illustrative projector 10 has a flat bottom wall formed by a horizontal base plate 49 which is spaced above the bottom wall 28 of the case, and the supporting means for slide holders comprise two supporting elements 50 and 51 projecting upwardly from the base plate toward the access opening 15 in spaced, parallel relation. One supporting element 50 is a shaft that rotatable about a fixed axis 52 adjacent the projection station 24, and the other element 51 is a cylindrical roller that is carried by a slide 53 that is movable laterally back and forth along a horizontal slideway 54 on the base plate.

The shaft 50 and the roller 51 are supported on the base plate 49 and the slide 53, respectively, by hubs 55 and 57 at their lower ends, and are braced by thin upright brackets 58 and 59 extending along the inner sides of the shaft and the roller (that is, between them) so that a slide holder 12 may be dropped loosely over the supporting elements without any interference from the associated mounting structure. After a slide holder has been placed around the shaft and the roller, with the latter in the contracted condition, the roller is moved away from the shaft and positioned to tension the holder, after which the projector is ready for operation. During such operation, slides are fed one by one into a projection position (see FIG. 6) extending laterally from the shaft across the optical axis of the projector in the projection station 24, in response to step-by-step rotation of the shaft 50 through selected angular increments of rotation sufficient to move the belt 47 an amount approximately equal to the width of one clip 45.

More specifically, the hub 55 of the shaft 50 is held on the shaft by a set screw 60 (FIG. 6) and is rotatably supported above the base plate 49 by a stem 61 which extends upwardly into the hub through a circular hole 62 in the base plate. Beneath the base plate, the stem is journaled in a sleeve 63 which is fastened to the underside of the base plate by screws 64, one screw being shown in FIG. 6. A flange 65 on the lower end of the stem bears against the lower end of the sleeve and is rotatable with the hub and the shaft.

Figure 10:
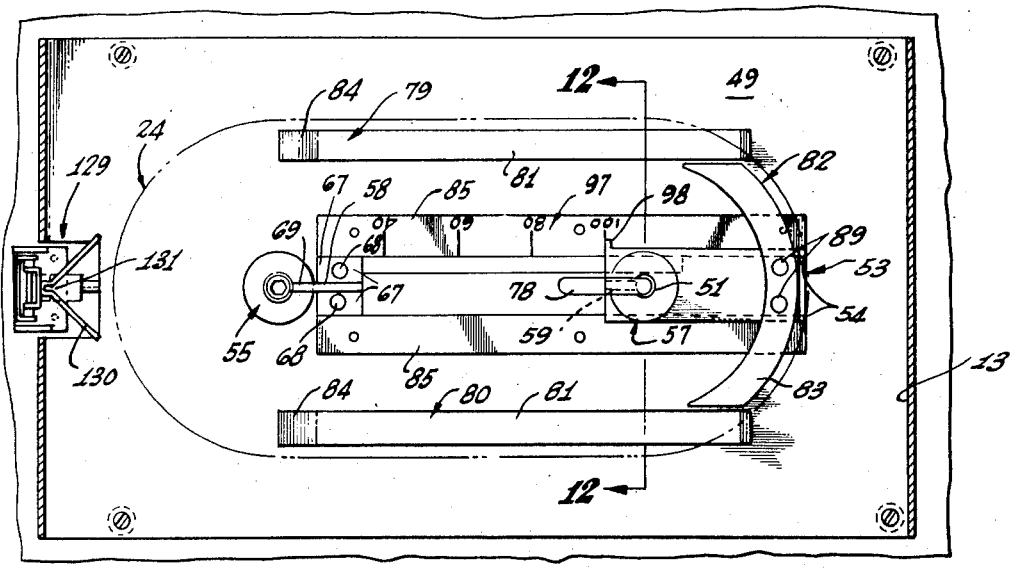
FIG. 10 is a fragmentary view on a reduced scale, partly in cross-section and partly a plan view, taken substantially along line 10—10 of FIG. 6, with the slide holder removed from the projector.

The bracket 58 bracing the shaft 50 extends upwardly along the right or inner side of the shaft, as viewed in FIGS. 6 and 10, and has horizontal base tabs 67 that are fastened to the base plate 49 by screws 68. A laterally projecting arm 69 at the upper end of the bracket is spaced above the hub 55 a distance greater than the width of the belt 47, and is formed with a bore 70 through which the upper end portion of the shaft 50 extends, thus rotatably bracing this end of the shaft. Driving teeth 71 are formed on the shaft beneath the arm 69 and project radially from the arm one-hundred-and-eighty degrees apart, and a knurled cap 72 is pressed onto the shaft above the arm.

It can be seen that the shaft 50 thus is mounted to support a slide holder 12 with a slide 11 extending laterally, to the left in FIG. 6, across the optical axis in the projection station 24. For optimum positioning of slides, the shaft is of polygonal cross-section, preferably square, and the increments of rotation of the shaft correspond to the number of flat sides it has, 90° with a square shaft.

The hub 57 of the roller 52 (see FIG. 6) is nonrotatably secured to the slide 53, and the roller is rotatably supported on an elongated, upright pin 73 which extends upwardly from the hub through a coaxial center bore 74 through the roller. The bracing bracket 59 is suitably fastened at its lower end to the slide, on the left or inner side of the roller as viewed in FIGS. 6 and 10, and extends upwardly alongside the roller to a level spaced above the hub a greater distance than the width of the belt 47. The upper end portion of the pin extends through a bore 75 in a laterally projecting arm 77 on this bracket, which thus braces the pin 73 and the roller 51. A knob 78 is fastened to the upper end of the pin, above the arm 77. In this manner, both the shaft 50 and the roller 51 are supported from the lower ends, and are braced from their inner or adjacent sides, to receive the slide holder freely around them when they are more closely spaced than the length of the opening in the slide holder.

Figure 12:
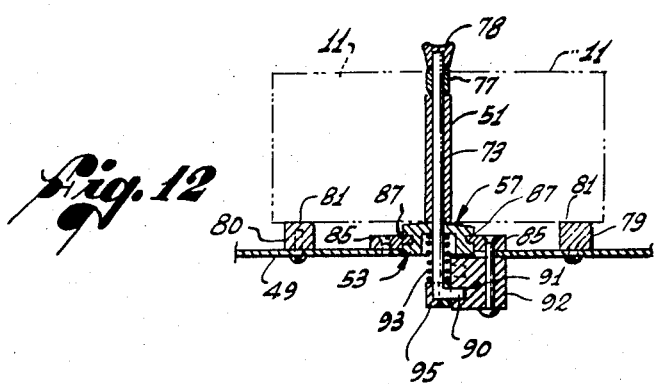
FIG. 12 is a fragmentary cross-section taken along line 12—12 of FIG. 10.

To complete the means for initially supporting slide holders 12 in the projector 10, transverse guide rails 79 and 80 (see FIGS. 7, 10 and 12) are mounted on the base plate 49 on opposite sides of an imaginary line drawn between the two supporting elements, with flat upper surfaces 81 at the proper level for the lower edges of slides carried by a slide holder, as shown most clearly in FIGS. 7 and 12. In addition, an arcuate guide rail 82 (FIGS. 6 and 10) is fitted between the right end portions of the transverse guide rails, with its flat upper surface 83 at the same level, this level also being the level of the uppermost surfaces of the two hubs 55 and 57.

Accordingly, as a slide holder 12 is inserted edgewise into the projector 10, the lower edge of the belt comes to rest against the upper surfaces of the hubs, and the lower edges of the slides on the holder come to rest against the guide rails 79, 80 and 82, so that the holder is positioned at the proper level for projection of the slides, even before the roller 51 is moved away from the shaft 50 to tension the belt 47. The upper surfaces of the hubs are beveled to facilitate proper movement of the holder and slides around these hubs, particularly around the square shaft 50 where there is no guide rail, and the left end portions 84 (FIG. 10) of the guide rails 79 and 80 also are beveled to form inclines for avoiding catching of slides moving in either direction from the projection station 24 onto the guide rails. It will be noted that the bevel on the hub 55 also serves to guide the belt up to the proper level as it is tensioned, if there is any tendency to sag before such tensioning.

As shown most clearly in FIGS. 10 and 12, the slide-way 54 for the roller-supporting slide 53 is formed by two spaced bars 85 lying along opposite sides of the path of the slide and having longitudinal ribs 87 on their adjacent sides spaced above the base plate 49 and slidably received in grooves in the sides of the slide. This forms a dovetail support for the slide permitting it to move through a substantial range. The arcuate guide bar 83 is secured to the top of the slide by two fasteners 89 (FIG. 10), and thus moves back and forth with the slide, in a fixed position relative to the roller 51.

The slide 53 is selectively positioned relative to the fixed shaft 50 to accommodate slide holders of various sizes and slide capacities, and a selected, approximate spring force is applied to the slide 53 to properly tension the slide holder in each operative position. As shown in FIGS. 6 and 12, the pin 73 which supports the roller 51 extends downwardly through the hub 57 and the slide 53, and a follower 90 is secured to the lower end of the pin to engage a track 91 on an elongated positioning bar 92 which is suspended from the underside of the base plate 49. The track herein is a groove in one side of the bar, at least as long as the full range of motion of the slide, and the follower 90 is a laterally projecting extension of the pin 73 which fits slidably into the groove.

At selected intervals along the track groove 91, branch grooves 91a, 91b, 91c, and 91d intersect the main groove and are inclined downwardly and to the right (FIG. 6) therefrom at angles of about 45°. Thus, the follower 90 on the pin 73 is movable back and forth along the main groove as the slide 53 and roller 51 are moved toward and away from the fixed shaft 50, and the follower is movable into any selected branch groove 91a, 91b, 91c or 91d. To permit such movement, the pin 73 is vertically slidable relative to the bracket 59, the roller 51, and the slide 53, and the knob 78 on the upper end of the pin forms a conveniently accessible grip for use in effecting both up and down shifting of the pin and lateral sliding of the pin-and-slide assembly.

Telescoped onto the lower end portion of the pin 73 is a coiled compression spring 93 which is fitted at its upper end into a recess 94 in the underside of the slide 53 and is compressed between the bottom of this recess and a block 95 that is clamped on the lower end of the pin and rides along the side of the bar 92. the follower projects out of the side of the block and into the track 91 in the positioning bar 92. Thus, the spring acts between the slide and the block 95 to urge the pin 73 downwardly relative to the slide, and similarly urges the follower 90 downwardly relative to the positioning bar.

Whenever the follower 90 is aligned with the upper, entry end of one of the branch grooves and the pin 73 is released, the spring 93 shifts the follower downwardly into the aligned branch groove, and the upwardly facing but inclined wall of the groove serves as a ramp which cooperates with the follower to cam the pin, and thus the slide 53 and the roller 51, to the right, in a direction to tighten the slide holder 12 around the positioning elements 50 and 51. The range of lateral motion of the slide while the follower 90 is in each branch groove is designed to expand the positioning elements from a size smaller than the minimal internal size of a slide holder of a given capacity (when the follower is at the top of the groove) to a size larger than the maximum size of such a holder (when the follower is at the bottom of the groove). The follower should not "bottom out" in a branch groove, because this would prevent the application of the proper tension to the holder. This arrangement accommodates variations in sizes of holders of a given capacity resulting from such things as variations within manufacturing tolerances, stretch, and changes due to temperature variations, while insuring that the tensioning force applied to each holder, regardless of capacity, is substantially the same.

The horizontal portion of the main positioning groove 91 immediately to the left (FIG. 6) of each branch groove provides a "rest" position for the follower 90 in a contracted condition for each of the expanded conditions, four capacities being provided for in the illustrative projector. To contract the supporting elements 50 and 51 preparatory to insertion of a slide holder 12, the operator simply pulls up on the knob 78 and pushes it to the left, thereby sliding the follower out of the branch groove it is in, and then sliding it along the main groove to the "rest" position. When the knob is released, the spring 93 urges the follower downwardly against the lower wall of the main groove, and thereafter exerts a frictional braking force for maintaining the slide 53 stationary as a slide holder is fitted into the projector.

A calibrated marker 97 (FIG. 10) may be provided along the path of a pointer 98 on the slide, and marked to indicate the different positions of the slide for holders of the different capacities. This marker preferably is a transparent insert in the base plate 49 and is illuminated from below for convenient changing of slide holders in the dark. The capacities of the illustrative projector, in numbers of slides held, are shown by the indicia "40," "60," "80" and "100" on the marker in FIG. 10, although the projector may be adapted for only one size, or for any combination of different capacities within the practical limitations imposed by the size of the case that is to be used.

Figure 11:
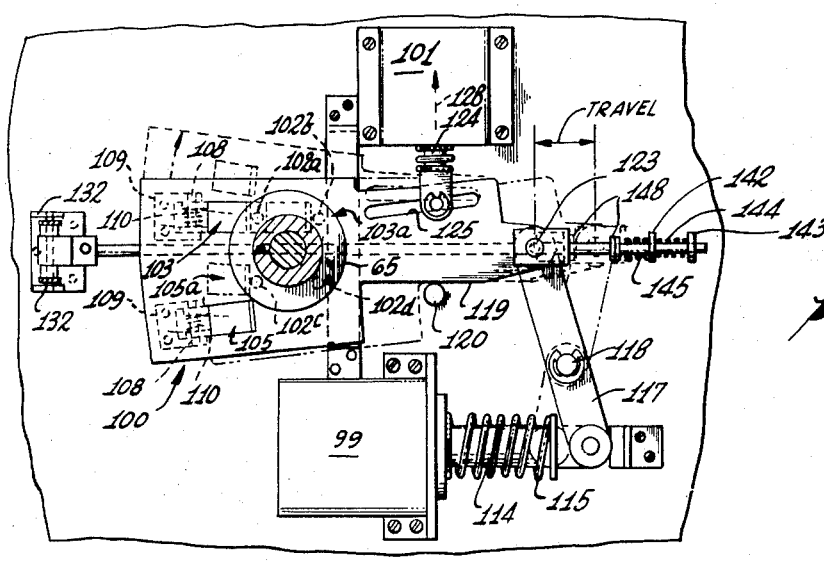
FIG. 11 is a fragmentary view on a similarly reduced scale taken substantially along line 11—11 of FIG. 6.

In accordance with a primary aspect of the present invention, the projector 10 is equipped with a novel, relatively simple, and inexpensive drive mechanism, shown most clearly in FIGS. 6 and 11, for driving each slide holder 12 step by step and reversibly, at very high speed and with little noise. In general, this drive mechanism comprises a reciprocating drive motor 99 in the form of an electromechanical solenoid, a driver 100 moves back and forth through drive and return strokes each time the solenoid is actuated, a ratchet coupling between the driver and the hub for advancing the square shaft 50 through its selected increment during each drive stroke, and a second solenoid 101 for changing from forward to reverse operation, and back.

As will be seen in FIGS. 6 and 11, the ratchet coupling includes a plurality of angularly spaced abutments, herein pins 102, depending from the underside of the flange 65 rotatable with the square shaft 50 and arranged around the axis of the shaft, and at least one ratchet lug 103 carried by the driver and reciprocable back and forth beneath the flange to engage successive pins and turn the flange and the shaft through the selected increment during each forward stroke of the driver, returning idly without moving the driver back during the return stroke. In this instance, there are four pins equally spaced around the axis of the shaft, and the driver 100 is simply an elongated flat plate, which may be a sheet metal stamping. This plate is disposed in a generally horizontal position beneath the base plate 49 and is slidable back and forth, herein transversely of the case, on top of an inverted U-shaped stand 104 that is fastened to the bottom wall of the case.

The left end portion of the driver 100 extends to the left beyond the flange 65 and preferably carries two side-by-side ratchet lugs 103 and 105 adjacent its left end. These lugs are disposed in openings 107 in the driver, and are pivoted on pins 108 on the underside of the driver to swing downwardly from the raised positions shown in FIG. 6, the pins being carried on yokes 109 shown most clearly in dotted lines in FIG. 11. Wire springs 110 hold the lugs yieldably in the raised positions shown, in which generally vertical left sides 111 of the lugs project upwardly above the driver and in which the flat upper sides 112 of the lugs are inclined upwardly and toward the right from the top of the driver. The springs permit the lugs to yield downwardly in response to depressing forces applied to the inclined upper sides, but upward swinging of the lugs from the raised position shown is blocked by stops 113 (FIG. 6) on the yokes 109 engaging the left sides of the lugs.

The main solenoid 99 is connected to the right end of the driver 100 to shift it back and forth through the selected increment of movement as the plunger 114 of the solenoid is moved back and forth in the usual way. Herein, the plunger normally is held in an extended position (as shown in full lines in FIG. 11) by a compression spring 115 coiled around the plunger, and is retracted when the coil (not shown) of the solenoid is energized. This motion is transmitted to the driver through a horizontally swingable lever 117 pivoted between its ends on a pin 118 upstanding from the bottom wall 28 of the case, and pivotally connected at its opposite ends to the plunger 114 and to the driver 100.

The fulcrum pin 118 of the lever 117 is closer to the plunger 114 than to the driver 100, to increase the length of stroke of the driver relative to the stroke of the plunger. It will be evident that the solenoid 99 could be directly connected to the driver, and that the lever arrangement is primarily a convenience permitting compact side-by-side mounting of the driver and the solenoid and providing versatility as to the stroke length.

When the driver 100 is in the position shown in full lines in FIG. 11, with its side surface 119 abutting slidably against a guide pin 120, the ratchet lug 103 is aligned with the abutment pin indicated at 102a so that, upon movement of the driver to the right by the solenoid 99, this lug 103 engages the abutment pin 102a and pushes it to the right, clockwise about the axis 52 of the square shaft 50, to the position indicated at 102b, thus turning the shaft clockwise through an angular increment determined by the extent of movement of the pin 102a as the lug moves to the position indicated at 103a. The stroke of the driver, after engagement of the lug with the pin, is selected to produce the desired increment of indexing of the shaft, herein ninety degrees.

For precisely locating the shaft 50 at the end of each indexing step, a spring-loaded ball detent 121 (FIG. 6) is mounted in a bore 122 in the sleeve 63 above the flange 65 and positioned to seat in one of four recesses in the upper side of the flange. This latches the shaft releasably in each new position after each indexing stroke of the driver.

When the main solenoid 99 is deenergized, the spring 115 snaps the plunger 114 back to its extended position, thereby pushing the driver 100 back to the left through its return stroke. It will be seen in FIG. 11 that each forward stroke (to the right) of the driver indexes one pin 102 from the position 102a while moving another to this position, which is in line with the lug 103 during its return stroke. The inclined upper side 112 of the lug engages the pin in the position indicated at 102 during the return stroke, and acts as a cam for depressing the lug sufficiently to pass the pin without changing its position, the pin being held in place by the ball detent 121. The lug then snaps back to the raised position, ready for the next forward stroke of the driver.

In the foregoing manner, successive cycles of the main solenoid 99 index the square shaft 50 step by step in one direction, clockwise as described above, to feed successive slides 11 into the projection station 24. It should be noted that these cycles may be made very rapid, so that the entire slide-changing operation is accomplished with a simple "flip" action in a fraction of a second.

The reversing solenoid 101 is connected to the driver 100 to rock it about the pivotal connection 123 at the right end, between the dotted and full line positions in FIG. 11, and brings the ratchet lug 105 into position to index the square shaft 50 reversely when the driver is in the dotted line position. For this purpose, the plunger 124 of this solenoid is pivotally connected to the driver, to the left of the pivot 123, by means of a pin passing through an elongated slot 125 in the driver for accommodating the back and forth motion of the driver during its driving and return strokes, the longitudinal axis of this slot being parallel to the direction of reciprocation during reverse operation. The reversing solenoid is deenergized for forward operation, and a spring 127 holds the plunger in the extended position shown, thereby activating the ratchet lug 103. When the reversing solenoid is energized, the plunger is retracted (in the direction of the arrow 128), thereby swinging the driver 100 to the dotted line position and activating the ratchet lug 105 by swinging it to the position indicated at 105a.

In this position, the lug 105 is aligned with the abutment pin 102 in the position indicated at 102c, to shift the pin to the right, counterclockwise about the axis 52 of the square shaft, to the position indicated at 102d during the forward stroke of the driver 100. This turns the shaft counterclockwise through an angular increment of 90°, and thus feeds the slide holder reversely in the projector. In all other respects, reverse operation is identical to forward operation.

A slide-positioning device 129 locks each slide 11 quickly and positively into the proper plane for projection as an incident to the feeding of the slide into the projection station 24. As shown in FIGS. 6 and 10, this device includes a plate 130 of generally V-shaped cross-section which is supported alongside the projection station, on the side thereof opposite the square shaft 50, with the vertex of the "V" aligned with the shaft and formed with a vertical groove 131 sized to receive the edge of a slide with a close fit. This plate, hereinafter referred to as the positioning fork, is supported on one side of a parallelogram linkage (four links 132, 133, 134 and 135), one link 132 of which is fastened in an upright position to the bottom wall 28 of the case with the second link 133 pivotally connected to its upper end, the third link 134 pivotally connected to its lower end, and the fourth link 135 pivotally connected between the free ends of the second and third links and carrying the positioning fork 130. The links are coupled for movement into a vertically aligned retracted arrangement shown in full in FIG. 6, and for swinging to the right to the extended position shown in broken lines in FIG. 6. Since the positioning fork 130 is carried on the link 135, which remains parallel to the fixed vertical link 132, the fork also remains vertical while moving to the right and dropping slightly below the full-line position shown. The links are arranged to nest together in the vertically aligned condition.

With this arrangement, the back-and-forth motion of the driver 100 may be utilized to operate the positioning fork 130 in precisely timed relation with the feeding of slides 11 into the projection station 24, during the final portion of the stroke of the driver after a new slide has been brought into the zone of reach of the fork. To this end, an elongated connecting rod 137 is pivotally connected to the lower movable link 134 of the parallelogram linkage above the lower pivot thereof, herein by a fitting 138 that is adjustable on the connecting rod, and extends across the projector beneath the driver 100 and loosely through a connector 139 pivotally carried by the driver beneath the right end (FIGS. 6 and 11) thereof. Herein, the connector is shown as a block with a bore 140 (FIG. 6) through which the rod extends, and an L-shaped bracket 141 loosely pinned to the driver for movement therewith and for swivelling motion thereon.

Beyond the connector 139, the connecting rod 137 has an annular collar 142 that is secured thereto, in spaced relation with the connector (when the driver is in the position shown in full lines), and extends slidably through a hole in a supporting bar 143 projecting upwardly from the bottom wall of the case. A coiled spring 144 is compressed between the collar and the supporting bar to urge the connecting rod to the left and hold the linkage and the positioning fork in the retracted, full-line positions in FIG. 6, while permitting movement of the connecting rod to the left to pull the linkage to the extended, broken-line position.

Telescoped onto the connecting rod 137 between the connector 139 and the collar 142 is a short cushioning spring 145 which is stiffer than the return spring 144, and which is considerably shorter than the spacing between the connector 139 and the collar 142 when the driver 100 and the positioning fork 130 are retracted. A washer 147 is disposed between the connector and the cushioning spring to be engaged by the connector as it moves to the right, during the forward stroke of the driver, so as to press the cushioning spring 145 against the collar 142 and thereby urge the connecting rod 137 to the right against the action of the return spring 144.

This couples the driver 100 to the connecting rod 137 in a cushioned and yieldable manner, after a preselected amount of motion of the driver sufficient to bring a new slide 11 almost into the projection station 24, and then uses the remaining motion of the driver to draw the positioning fork 130 into engagement with the slide. In addition to providing the necessary delay for slide movement into the projection station, this lost-motion connection avoids overloading the main solenoid 99 during the initial portion of its stroke when its force output is lowest, and applies the load of the fork to the solenoid only during the final portion of the stroke when the force output is highest. Thus, the fork is pulled quickly and firmly into engagement with the slide. The spring 145 cushions the force applied to the slide through the fork, and the elongated "V" of the fork distributes the force over a substantial area to minimize danger of deformation of the frames of slides during prolonged periods of repeated use. It should be noted that the sound of impacts between the connector 139 and the washer 147 may be deadened by ring-like pads 148 on the counter and the washer.

To insure that a given increment of turning of the square shaft 50 produces a corresponding amount of feeding of the slide holder 12, the slide holder is constructed to cooperate with the detents or teeth 71 on the upper end portion of the shaft to provide a positive drive coupling which utilizes the slide-holding clips 45 as driving abutments. This can be particularly significant when the clips are supported by a fabric belt 47 which is more susceptible to slipping on the shaft, and which also would be unsuitable for a positive, toothed connection to the driving shaft.

More specifically, and as shown most clearly in FIGS. 4, 5 and 6, alternating recesses and driving abutments are provided by alternate clips 45 in the series of clips on the belt, for engagement with the teeth on the shaft, by using clips of two different lengths and alternating the two lengths around the belt. The shorter clips have about the same length as the width of the belt, or a slightly greater length, and the longer clips project beyond the upper edge of the belt farther than the shorter clips, and far enough to serve as the driving abutments for engagement with the teeth 71 on the square shaft, when the teeth project into the recesses between the longer clips.

As shown most clearly in FIG. 5, the teeth 71 on the shaft 50 are arcuate tabs which project radially from the opposite sides of the upper end portion of the shaft, level with the spaces between the ends of the longer clips, and thus extend into the spaces in interlocking relation with the longer clips as the latter pass around the shaft. Should the belt 47 tend to slip, the teeth 71 block such slipping and thus insure that the slides are advanced into the proper range to be picked up by the positioning fork 130.

To provide a safety drop-out of the drive mechanism when the cover is open, and also for quick scanning of a series of slides 11 on a slide holder 12 in the projector 10, a switch 149 (FIG. 8) is mounted in the projector, and an operator in the form of a pin 150 (FIGS. 1 and 8) is positioned on a swingable edge of the cover 17 to move into an operable position (FIG. 8) as the cover is moved to a nearly closed position, and to actuate the switch 149 in response to momentary depression of the cover from the nearly closed position. When the cover is pressed into the fully closed position (FIG. 9), the scanning switch is held closed and the controls shown on the rear wall in FIG. 1 are activated for normal operation.

As shown in FIGS. 1 and 8, the operator pin 150 is pressed into a recess 151 in the cover 17 to extend away from the latter, and the switch 149 is supported below the closed position of the cover and provided with an actuating button 152 which, when depressed from the raised position in FIG. 8, actuates the main drive solenoid 99 to initiate a cycle of the driver 100. A disc 153 engaging the actuating button 152 is guided in a sleeve 154 extending upwardly toward a rim 155 (see FIG. 1) surrounding the access opening 15, and a spring 157 is positioned in the sleeve between the disc 153 and a second disk 158 which is held against the underside of the rim 155. A cylindrical head on top of the upper disk 158 fits loosely into a hole in the rim 155, the hole being positioned to receive the lower end of the operator pin 150 as the cover 17 is moved to the closed position. The head of the disk 158 may have a cylindrical recess for receiving the pin 150.

Accordingly, as the cover 17 is moved toward the closed position, the pin 150 moves into engagement with the upper disk 158 and, unless pressed to the fully closed position, comes to rest as illustrated in FIG. 8. The various parts hold the cover in this position without actuating the scanning switch 149. However, when the cover is pressed down with a light force and then released, the switch button 152 is depressed, actuating the solenoid 99 to advance the slide carrier 12 through one step. With this arrangement, the cover can be tapped repeatedly and in rapid succession to scan the slides in the holder. In a dark room of the type normally used for the viewing of slides, this is a very convenient way to check the slides rapidly.

On the front edge of the cover 17, generally in the center, is a latch spring 159, which is shaped to engage the top wall adjacent the access opening and to be pressed into the latched position shown in FIG. 9. Thus, the cover can be pressed firmly into the fully closed position, and latched therein for normal operation. As this is done, the scanning switch 149 is actuated as the cover moves through the scanning position, and is latched in when the cover is latched in the closed position, leaving the projector ready for operation by means of the normal controls. Switches having the foregoing capabilities are well known in the art, so the details of the switch 149 are not shown herein. To facilitate opening of the cover, a gripping recess 160 (FIGS.

1 and 9) is formed in the rear edge of the cover adjacent the center.

A modified form of the drive mechanism for the projector 10 is shown in FIGS. 13–15, in which many of the basic parts are the same as those previously described, and thus are indicated by the same reference numbers. The first modification illustrated in these figures is a hold-out apparatus 161 which is operated by the projector drive mechanism to engage both slides 11 on opposite sides of the slide in the projection station 24, and to press them positively away from the projection station, thereby cooperating with the square shaft 50 in keeping these slides out of the light beam, and also serving to draw the belt 47 tightly around the square shaft for optimum positioning of the slide held between the shaft and the positioning fork 130.

The hold-out apparatus 161 comprises a rocker shaft 162 suspended beneath the base plate 49, generally parallel to the optical axis on two depending lugs 163 fastened to the underside of the base plate, two spring arms 164 extending generally radially from the rocker shaft in alignment with two slots 165 in the base plate, and an actuating rod 167 connected beween a radial crank arm 168 on the rocker shaft and the lower movable link 134 of the parallelogram linkage for actuating the positioning fork 130. As the link 134 swings to the right (FIG. 15) during movement of the positioning fork into engagement with a slide 11 in the projection station 24, the actuating rod 167 is shifted to the right to turn the crank arm 168 and the rocker shaft 162 clockwise, swinging the spring arms 164 upwardly and to the right through the slots 165 from the lowered or retracted positions shown in full lines in FIG. 15 to the raised positions shown in broken lines.

This motion of the spring arms 164 moves their free end portions into pressing engagement with the two slides 11 on opposite sides of the slide in the projection station 24, and presses them firmly to the right, away from the slide being projected, thus tensioning the belt while holding the slides positively out of the light beam from the lamp 18. As the positioning fork 130 is disengaged, movement of the link 134 back to the left rocks the shaft 162 counterclockwise to return the spring arms to the retracted positions to permit movement of the slide carrier 12 to bring a new slide into the projection station.

Another modification in FIGS. 13 and 14 is a shutter 169 for blocking the light beam from the lamp 18 whenever the slide holder 12 is being driven to feed a new slide 11 into the projection station 24, thus preventing possibly objectionable light flashes on the viewing screen. This shutter also is operated in timed relation with the slide holder 12 by coupling it to the projector drive mechanism, herein through the rocker shaft 162.

For this purpose, and as shown in FIGS. 13 and 14, the shutter, which herein is a disk sized to cover the inner end of the objective lens barrel 22, is carried on one end of an L-shaped arm 170 that is coupled to the rocker shaft 162 adjacent one end thereof, the lower end as viewed in FIG. 13. The angular position of the L-shaped arm is such that the shutter disk is oscillated back and forth between a "closed" or blocking position shown in full lines in FIG. 14 (when the positioning fork 130 is retracted) and an "open" position shown in broken lines (when the positioning fork is extended into engagement with a slide.

It will be seen in FIG. 14 that the arc 171 through which the spring arms 164 travel is greater than the arc 172 of oscillation of the shutter disk 169, this difference being included primarily for clearance considerations. To produce this difference, the shutter disk is mounted on the rocker shaft 162 by means of a hub 173 in the form of a sleeve rotatable on the rocker shaft, and a radial pin 174 on the shaft projecting outwardly through enlarged notches 175 in the hub sleeve with a clearance fit, so as to form a lost-motion connection for dissipating part of the angular motion of the rocker shaft.

In other words, the pin 174 has a limited amount of angular travel relative to the hub 173, and thus turns the hub to oscillate the shutter disk only during the remaining travel. Stop pins 177 and 178 abut against opposite sides of the L-shaped arm 170 to determine the two positions of the shutter disk.

SUMMARY OF OPERATION

Although the manner of operation of the projector 10, equipped with the drive mechanism of the present invention, should be apparent from the foregoing, it is believed that a brief summary of the operating procedures may contribute to a better understanding and appreciation of the features and advantages of the invention. Assuming that the projector has been positioned relative to a screen and plugged in to an appropriate power source, and that a supply of slides 11 to be viewed is conveniently accessible, typically in storage boxes (not shown) in which the holders 12 are in the compact, block-like condition of FIG. 2, the projector may be turned on to activate the exhaust blower and the lamp 18, and the cover 17 is opened, as shown in FIG. 1, to receive the first slide holder and the slides 11 thereon to be viewed.

The movable supporting element (roller 51) is located relative to the fixed shaft 50 to receive a holder 12 of the capacity to be viewed, simply by pulling up on the knob 78 and moving the slide 53 until the pointer 98 (FIG. 10) is just to the left of the number ("40," "60," "80," or "100" on the marker 97) corresponding to the size of the holder, and then releasing the knob so that the spring 93 presses the follower 90 against the lower wall of the main groove 91 to hold the slide 53 and the roller 51 releasably in place. Then the slide holder is removed from its container, held in the manner shown in FIG. 1, and fitted into the recess 13 and loosely over the positioning elements 50 and 51.

The belt 47 of the slide holder 12 engages the hubs 55 and 57 as the slides 11 on the holder engage the guide rails 79, 80 and 82, and the holder thus is positioned at the proper level in the projector. If desired, a tab (not shown) may be attached to one slide to indicate the beginning (and end) of the series.

With the slide holder 12 in place, the supporting elements 50 and 51 are expanded by lifting the knob 78 and shifting the slide 53 away from the square shaft 50, to the right in FIG. 1 and to the left in FIGS. 6 and 10, until the pointer 98 is aligned with the appropriate number on the marker 97, and then releasing the knob to the action of the spring 93. The spring then forces the follower 90 down the ramp of the aligned branch groove 91a, 91b, 91c or 91d, and thus cams the slide 53 to the right until the belt 47 is taut, as shown in FIG. 6 for a holder having a 100-slide capacity.

At this point, the projector 10 is ready for operation. The cover 17 may be moved to the nearly closed position (FIG. 8) and used as a convenient actuator for advancing the slides quickly and one-by-one for scanning, or may be pressed into the fully closed position for operation through the normal controls on the rear wall 32. In either case, the actuation of the scanning switch 149 by the pin 150 on the cover actuates the main solenoid 99 as the cover is depressed, feeding the slide holder 12 to bring the first slide 11 into the projection station 24 and operating the various locating elements, including the fork 130, to position this slide for projection.

Whether the slide holder 12 then is advanced under the control of the scanning switch 149 of under the control of either the cycle switch 42 or the timer 40, the slide-feeding operation is the same. Whenever the main solenoid 99 is deenergized, its plunger 114 is extended (to the right in FIG. 11) and the driver 100 is in its retracted position (to the left in FIG. 11). The positioning fork 130 is retracted, the hold-out arms 164 are in the lowered out-of-the way positions shown in full in FIG. 15, and the shutter disk 169 is in the blocking or "closed" position also shown in full in FIG. 14. This condition, of course, is the deenergized condition which exists only momentarily during normal operation, each time the slide holder 23 is being advanced.

When a slide 11 is to be positioned to be viewed, the condition is changed solely by energizing the main solenoid 99 to draw its plunger 114 inwardly, to the left in the drawings, against the action of the spring 115. When this occurs, the driver 100 is shifted rapidly to the right and the ratchet coupling acts through the pins 102 to turn the hub 55 and the square shaft one step, in a direction determined by the condition of the reversing solenoid 101. If the solenoid is deenergized as shown in full in FIG. 11, the direction is clockwise, or forward. If the solenoid is deenergized, the direction is counterclockwise, or reverse.

As previously mentioned, the initial portion of the stroke of the driver 100 turns the square shaft 50 and feeds the slide holder 12 are enough to bring a new slide 11 into the reach of the positioning fork 130, before the connector 139 on the driver is coupled to the connecting rod 137 by the cushioning spring 145 and the collar 142 on the connecting rod. Then, the remaining portion of the stroke of the driver acts through the connector, the cushioning spring and the collar to shift the connecting rod 137 to the right.

As this occurs, the positioning fork 130 is drawn into engagement with the slide 11 to be projected, to cam the left edge of the slide into the groove 131 in the fork and to clamp the slide between the fork and the square shaft 50. At the same time, the hold-out arms are pressed against the two adjacent slides to press them away from the projection station 24, and the shutter disk 169 is shifted away from the lens barrel 22 to the "open" position.

It bears emphasis that all of these operations that are effected by the connecting rod 137 occur during the final portion of the stroke of the driver 100 and the main solenoid 99, when the force output is at its peak. It has been found that about ten percent of the total stroke, or one-sixteenth inch, is sufficient and, of course, all of these operations occur very rapidly and in precisely timed relation with each other.

As long as the main solenoid 99 remains energized, a slide is held in the projection station 24 and will be projected on the viewing screen. Since cooling air is drawn continuously through the case and past the projection station, the slide therein is cooled sufficiently to prevent distortion. Thus, it is possible to view a slide for as long as is desired without need for refocusing.

When a slide is to be changed, all that is necessary is the momentary deenergization of the main solenoid 99, so that the spring 115 can extend the plunger 114 to retract the driver 100 and the positioning fork 130 while lowering the hold-out arms 164 and closing the shutter disk 169. When the solenoid is reenergized (preferably immediately), the driver is pulled back to the right to index the square shaft 50 and restore all of the other parts to the slide-projecting condition.

It should be noted that it is quite simple to change slides 11 in a slide holder 12 while the latter is in the projector 10. When the cover 17 is open, a slide can be pulled out of its clip 45 for replacement by another slide, to change its position in the clip, or to rearrange the slides in the holder, since the slides can be fitted edgewise back into the clips in the manner illustrated in FIG. 3. When a new slide holder is to be placed in the projector, the roller 51 is simply shifted toward the square shaft 50, using the knob 78 to contract the supporting elements to the proper position, thereby freeing the holder in the projector for removal, the "used" holder is lifted out through the access opening, and the new holder is placed around the supporting elements. Then the knob 78 is pulled upwardly and shifted back to the right until the follower 90 is in alignment with the appropriate branch groove, and is released to the action of the spring 93 which applies the proper tension to the belt 47.

From the foregoing, it will be apparent that the present invention provides a new and improved drive mechanism for a projector, having a number of significant features which cooperate to make the projector relatively simple in construction and effective in operation. It also will be apparent that, while preferred embodiments of the drive mechanism have been illustrated and described, various modifications may be made without departing from the spirit and scope of the invention.

We claim:

1. In a slide projector having means for supporting an endless slide holder arranged to hold a series of slides in side-by-side relation, said supporting means including an upright shaft around which said holder passes so that successive slides project outwardly on one side of said shaft into a projection station beside said shaft, a drive mechanism for said projector, comprising:

a hub at the lower end of said shaft having a plurality of abutments depending from its lower side, and angularly spaced around said hub at preselected intervals to be driven angularly to rotate said shaft;

a reciprocating driver mounted in said projector for generally horizontal back and forth movement beneath said hub, with the upper side thereof adjacent said hub;

a reciprocating actuator connected to said driver and operable when activated to move said driver in said one direction from an inactive position through a forward stroke, and then back in said other direction through a return stroke;

means for selectively positioning said driver relative to said hub for reciprocation along first and second laterally spaced paths;

and driving abutment means on said driver comprising two laterally spaced lugs projecting upwardly from said driver and mounted thereon for downward yielding, said lugs being spring-loaded upwardly and having substantially vertical sides for engaging said abutments during said forward strokes and inclined upper sides for engaging said abutments during said return strokes and acting as cams for pushing the lugs down to pass said abutments, one of said lugs being positioned for engagement with abutments along one side of said hub as the driver is reciprocated along said first path, and the other of said lugs being positioned for engagement with the abutments along the other side of said hub as the driver is reciprocated along said second path thereby providing selectively reversible operation of said projector.

2. A slide projector and drive mechanism as defined in claim 1 in which said reciprocating actuator is an electromechanical solenoid operable to reciprocate said driver with a snap action.

3. A slide projector and drive mechanism as defined in claim 1 in which said means for positioning said driver is an electromechanical solenoid connected to said driver to shift the latter generally horizontally back and forth between said first and second paths.

4. A slide projector and drive mechanism as defined in claim 1 further including hold-out means for engaging the slides on opposite sides of the slide in said projection station and shifting them away from said projection station, said hold-out means being connected to said driver for actuation thereby after a slide has been moved generally into said projection station.

5. A slide projector and drive mechanism as defined in claim 4 in which said hold-out means comprise two spring arms disposed on opposite sides of said shaft, a rocker supporting said arms for movement from retracted positions along opposite sides of said projection station toward the slides on opposite sides of said projection station, and into active positions, to engage such slides and shift them away from the projection station, and a link connecting said rocker to said driver for actuation thereby with said slide-positioning device.

6. A slide projector and drive mechanism as defined in claim 5 in which said projector has an optical system including an optical axis extending through said projection station, and further including a shutter movable back and forth across said optical axis to block and unblock said optical system during slide changing, said shutter being carried by said rocker for actuation therewith by said driver.

7. In a slide projector having an indexible slide positioning shaft that is movable step by step to feed slides one by one into and out of a slide projection station where one slide projects outwardly from one side of said shaft into said projection station while two adjacent slides project outwardly from two other sides of the shaft in angularly spaced relation with said one slide, a drive mechanism comprising:

a reciprocating actuator;

a driver reciprocable by said actuator through forward and return strokes;

ratchet coupling means acting between said driver and said shaft to index the latter one step during each forward stroke of the driver and to leave said shaft in each attained position during the subsequent return stroke;

means for selectively activating said reciprocating actuator to produce successive forward and return strokes of said driver when a slide is to be fed into said projection station;

hold-out means movably mounted along said two other sides for locating engagement with said two adjacent slides;

and means connecting said hold-out means to said reciprocating actuator for actuation thereby in timed relation with the indexing of said shaft.

8. A slide projector and drive mechanism as defined in claim 7 in which said ratchet coupling means have forward and reverse modes of operation, determined by the location of said driver in forward and reverse positions relative to said positioning element, and further including means for selectively shifting said driver between said forward and reverse positions for selective reversal of the direction of feeding of slides.

9. A slide projector and drive mechanism as defined in claim 8 in which said driver is an elongated member reciprocated longitudinally by said actuator, and reciprocated transversely between said forward and reverse positions by said shifting means.

10. A slide projector and drive mechanism as defined in claim 9 in which said element is a rotary shaft, and said ratchet coupling means include a hub on said shaft, angularly spaced driven abutments on said hub, and at least an driving abutment on said driver that is engageable with a driven abutment during each forward stroke and idly passes the hub during each return stroke.

11. A slide projector and drive mechanism as defined in claim 7 further including a slide-positioning fork supported for movement toward and away from said projection station to engage and hold the edge of a slide therein, and means connecting said fork to said actuator whereby the latter moves said fork in precisely timed relation with movement of the slides.

12. A slide projector and drive mechanism as defined in claim 11 in which said connecting means include a connecting rod secured to said positioning fork, and a connection between said rod and said driver whereby the latter moves the fork.

13. A slide projector and drive mechanism as defined in claim 12 in which said connection is a lost-motion connection permitting initial motion of said driver relative to said connecting rod during each forward stroke, and moving the rod only during the later portion of each stroke, thereby to shift said fork into engagement with a slide after the slide has moved substantially into the projection station.

14. A slide projector and drive mechanism as defined in claim 7 in which said projector has an optical system with an optical axis extending through said projection station, and further including a shutter mounted for movement across said axis between blocking and unblocking positions, and means connecting said shutter to said reciprocating actuator for actuation thereby in timed relation with the indexing of said shaft, to block said optical system during such indexing.

* * * * *

PO-1050
(5/69)

UNITED STATES PATENT OFFICE
CERTIFICATE OF CORRECTION

Patent No. 3,860,326      Dated January 14, 1975

Inventor(s) Gerald J. Frey et al.

It is certified that error appears in the above-identified patent and that said Letters Patent are hereby corrected as shown below:

Col. 3, line 49, change "the" (first occurrence) to --The--

Col. 4, line 61, change "rotatable" to --rotates--

Col. 5, line 51, change "52" to --51--

Col. 7, line 13, change "the" (second occurrence) to --The--

Col. 11, line 40, change "counter" to --connector--

Col. 13, line 67, insert a closing parentheses after "slide", thus --slide.)--

Col. 15, line 15, change "of" to --or-- line 27, change "23" to --12--.

Signed and sealed this 13th day of May 1975.

(SEAL)
Attest:

RUTH C. MASON
Attesting Officer

C. MARSHALL DANN
Commissioner of Patents
and Trademarks